US010554003B2

(12) United States Patent
Saito et al.

(10) Patent No.: US 10,554,003 B2
(45) Date of Patent: Feb. 4, 2020

(54) ROTARY CONNECTOR

(71) Applicant: ALPS ALPINE CO., LTD., Tokyo (JP)

(72) Inventors: Kengo Saito, Miyagi-ken (JP); Toshiaki Asakura, Miyagi-ken (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/199,542

(22) Filed: Nov. 26, 2018

(65) Prior Publication Data

US 2019/0097372 A1 Mar. 28, 2019

Related U.S. Application Data

(63) Continuation of application No. PCT/JP2017/006359, filed on Feb. 21, 2017.

(30) Foreign Application Priority Data

May 31, 2016 (JP) .................................. 2016-108708

(51) Int. Cl.
*H01R 3/00* (2006.01)
*H01R 35/02* (2006.01)
*B60R 16/027* (2006.01)

(52) U.S. Cl.
CPC ......... *H01R 35/025* (2013.01); *B60R 16/027* (2013.01); *H01R 2201/26* (2013.01)

(58) Field of Classification Search
CPC .. H01R 35/025; H01R 35/04; H01R 2201/26; B60R 16/027
See application file for complete search history.

(56) References Cited

U.S. PATENT DOCUMENTS

| 4,422,699 A | * | 12/1983 | Sakurai | ................. | B60R 16/027 439/15 |
| 4,824,396 A | * | 4/1989 | Sasaki | .................. | B60R 16/027 439/15 |
| 4,928,901 A | * | 5/1990 | Bannai | ................. | B60R 16/027 242/396 |
| 4,936,782 A | * | 6/1990 | Bannai | ................. | B60R 16/027 439/15 |

(Continued)

FOREIGN PATENT DOCUMENTS

| CN | 103378526 A1 | 10/2013 |
| JP | 10-64645 | 3/1998 |

(Continued)

OTHER PUBLICATIONS

Office Action from corresponding CN application No. CN201780026985.7, dated Jun. 28, 2019, 6 pgs.

*Primary Examiner* — Abdullah A Riyami
*Assistant Examiner* — Vladimir Imas
(74) *Attorney, Agent, or Firm* — Brinks Gilson & Lione (57) ABSTRACT

A rotor-side lead block integrally holds a plurality of external connection terminals electrically and directly connected to a connection land of a first sub FPC. The first sub FPC is housed and fixed in the rotor-side connector portion. The external connection terminals and the connection land of the first sub FPC are connected to each other via solder. The first holding member holds the connection land of the first sub FPC between the rotor-side lead block and the first holding member.

9 Claims, 11 Drawing Sheets

(56) References Cited

U.S. PATENT DOCUMENTS

| | | | | |
|---|---|---|---|---|
| 5,286,219 | A * | 2/1994 | Ueno | H02G 11/00 439/15 |
| 5,655,920 | A * | 8/1997 | Bannai | H01R 35/025 439/164 |
| 5,683,259 | A * | 11/1997 | Sato | B60R 16/027 439/164 |
| 5,700,153 | A * | 12/1997 | Kawamura | B60R 16/027 439/15 |
| 5,951,311 | A | 9/1999 | Kato et al. | |
| 5,951,322 | A * | 9/1999 | Nishikigi | B60R 16/027 439/456 |
| 6,155,106 | A * | 12/2000 | Sano | B60R 16/027 33/1 N |
| 6,213,798 | B1 * | 4/2001 | Kawamura | B60R 16/027 439/164 |
| 6,218,779 | B1 | 4/2001 | Cho | |
| 6,272,912 | B1 * | 8/2001 | Sano | B62D 15/02 33/1 N |
| 6,341,969 | B1 * | 1/2002 | Taniuchi | H01R 35/025 439/15 |
| 6,390,838 | B1 * | 5/2002 | Kawamura | H01R 35/025 439/164 |
| 6,641,415 | B2 * | 11/2003 | Maegawa | H01R 35/025 439/15 |
| 6,644,978 | B2 * | 11/2003 | Araki | H01R 35/025 439/15 |
| 6,733,300 | B2 * | 5/2004 | Oguma | B60R 16/027 439/15 |
| 6,736,645 | B2 * | 5/2004 | Kato | B60R 16/027 439/15 |
| 6,835,078 | B2 | 12/2004 | Maegawa | |
| 7,175,453 | B2 * | 2/2007 | Yajima | H01R 35/025 439/15 |
| 7,488,178 | B2 * | 2/2009 | Inotsuka | B60R 16/027 439/15 |
| 7,594,819 | B2 * | 9/2009 | Araki | H01R 35/025 439/164 |
| 8,678,835 | B2 * | 3/2014 | Takahashi | H01R 12/592 439/13 |
| 9,011,162 | B2 * | 4/2015 | Sato | B60R 16/037 439/15 |
| 9,673,585 | B2 * | 6/2017 | Tsushima | B60R 16/027 |
| 2002/0094700 | A1 * | 7/2002 | Kato | B60R 16/027 439/15 |
| 2016/0336704 | A1 * | 11/2016 | Tsushima | B60R 16/027 |
| 2019/0067892 | A1 * | 2/2019 | Asakura | B60R 16/027 |

FOREIGN PATENT DOCUMENTS

| | | |
|---|---|---|
| JP | 11-191364 | 7/1999 |
| JP | 2000-133399 A1 | 5/2000 |
| JP | 2004-63402 A | 2/2004 |
| JP | 2004-314901 A | 11/2004 |
| JP | 2013-219007 A | 10/2013 |
| JP | 2013-219007 A1 | 10/2013 |
| JP | 2015-109144 A | 6/2015 |

* cited by examiner

ROTARY CONNECTOR

CLAIM OF PRIORITY

This application is a Continuation of International Application No. PCT/JP2017/006359 filed on Feb. 21, 2017, which claims benefit of priority to Japanese Patent Application No. 2016-108708 filed on May 31, 2016. The entire contents of each application noted above are hereby incorporated by reference in their entireties.

BACKGROUND

1. Field of the Disclosure

The present disclosure relates to a rotary connector disposed on a steering column of an automobile or the like.

2. Description of the Related Art

On a steering column of an automobile, it is necessary to supply power for operating an air bag and transmit switching signals from a horn switch and various control switches, between a stator (stationary portion) and a rotor (rotary portion), and a rotary connector is used therefor.

In the rotary connector, the stator and the rotor are coaxially disposed so as to be rotatable, flat cables are housed and wound within a housing space defined between an outer cylinder forming the stator and an inner cylinder forming the rotor. The rotary connector is used as electrical connection means for an air bag inflator or the like mounted to a steering wheel having a limited number of revolutions such as a steering device of an automobile.

Japanese Unexamined Patent Application Publication No. 2013-219007 discloses a rotary connector in which a plurality of flat cables and a lead block are used for connecting rotor-side external connection terminals and stator-side external connection terminals.

However, the flat cables have problems, for example, (1) PET (polyethylene terephthalate) is used for an insulating film and thus the heat resistance thereof is low, (2) an increase in the number of signal lines also increases the number of flat cables since it is difficult to provide fine pitches, etc.

In addition, in the related art, the external connection terminals are connected to connection terminals of the flat cables by means of spot welding. Thus, for production of the rotary connector, a large-scale spot welding apparatus is required, and there is also a problem in that the assembling efficiency is poor since setting of the flat cables is performed on the spot welding apparatus.

SUMMARY

A rotary connector includes: a stator; a rotor disposed so as to be relatively rotatable relative to the stator; a flexible printed circuit board housed within an annular space between the stator and the rotor and connected at both ends thereof to the stator and the rotor, respectively; and a lead block integrally holding a plurality of external connection terminals connected to the flexible printed circuit board, the lead block being fixed to at least one of the rotor and the stator, and the flexible printed circuit board has a connection land to which the external connection terminals are connected via solder.

According to this configuration, since the flexible printed circuit board including the connection land is used, and the lead block, which integrally holds the plurality of external connection terminals and is fixed to at least one of the rotor and the stator, is used, it is possible to stably connect the flexible printed circuit board to the external connection terminal even when the external connection terminals are connected via solder. Thus, in the production process, it is possible to connect the flexible printed circuit board to the external connection terminal, so that assembling is easy.

DESCRIPTION OF THE PREFERRED EXEMPLARY EMBODIMENTS

Hereinafter, a rotary connector according to an embodiment of the present invention will be described.

Figure 1:
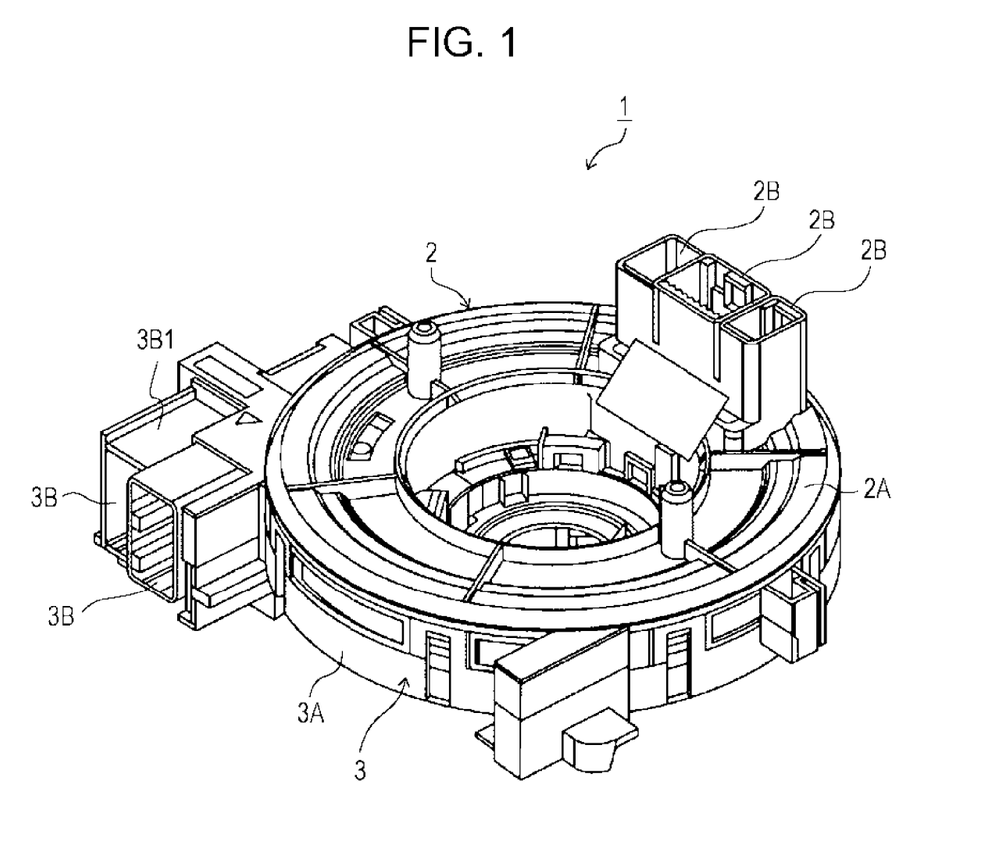
FIG. 1 is an external perspective view of a rotary connector according to an embodiment of the present invention.
Figure 2:
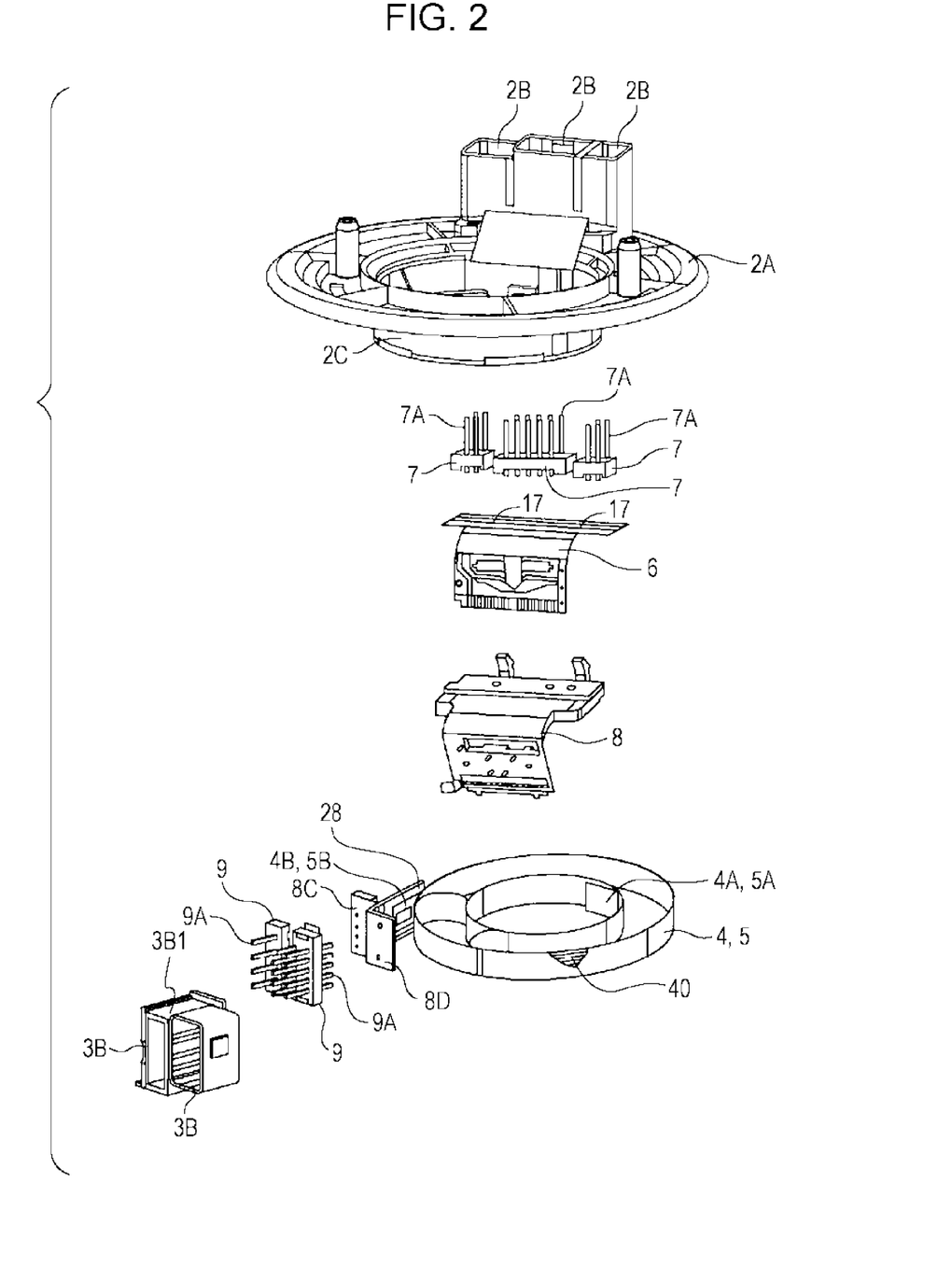
FIG. 2 is an exploded perspective view of a main part of the rotary connector shown in FIG. 1.
Figure 3:
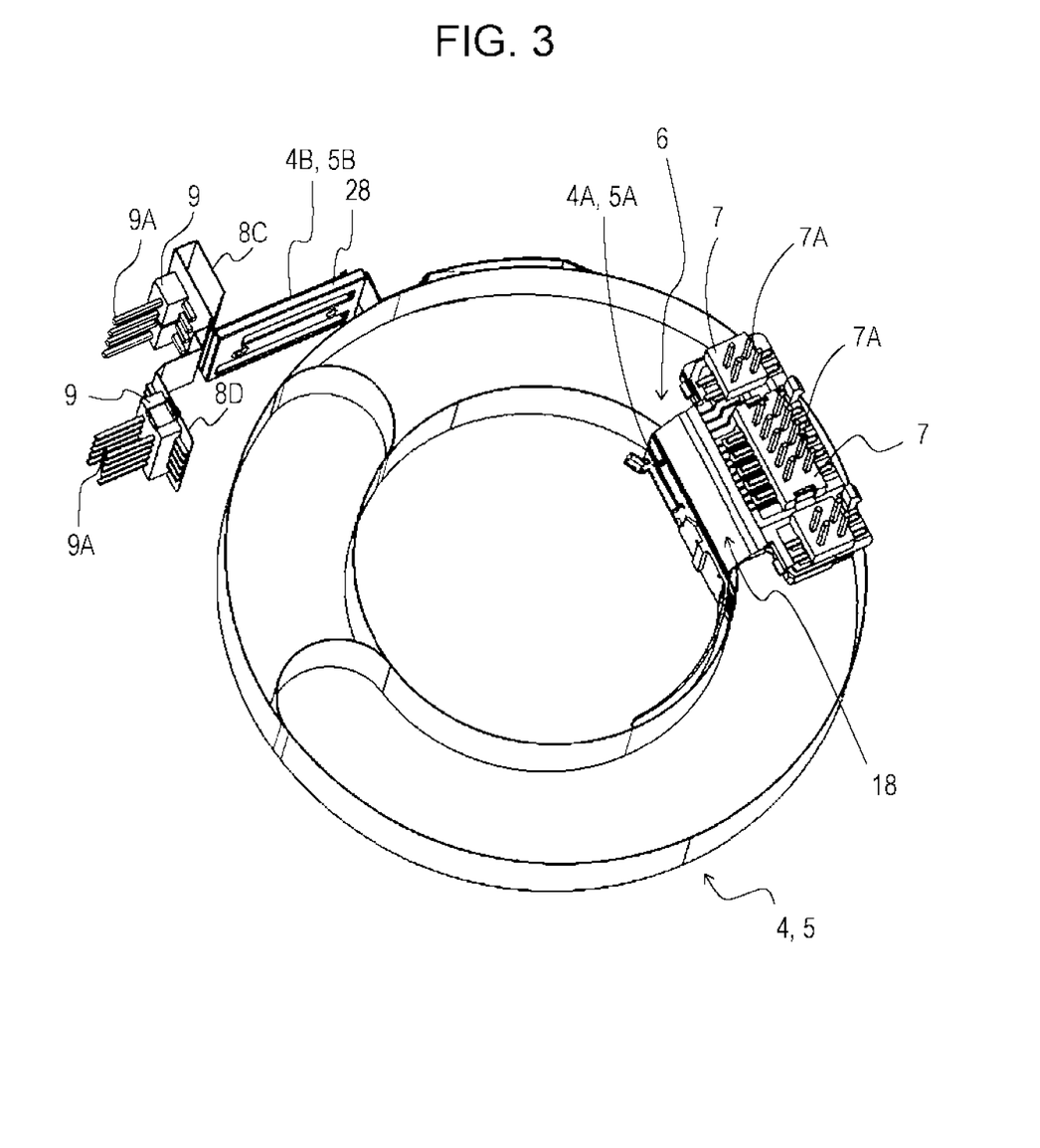
FIG. 3 is a perspective view for explaining a connection relationship between both end portions of a first main FPC and a second main FPC and external connection terminals shown in FIG. 2.

FIG. 1 is an external perspective view of the rotary connector according to the embodiment of the present invention. FIG. 2 is an exploded perspective view of a main part of the rotary connector shown in FIG. 1. FIG. 3 is a perspective view for explaining a connection relationship between both end portions of a first main FPC 4 and a second main FPC 5 and external connection terminals 7A and 9A.

Figure 4:
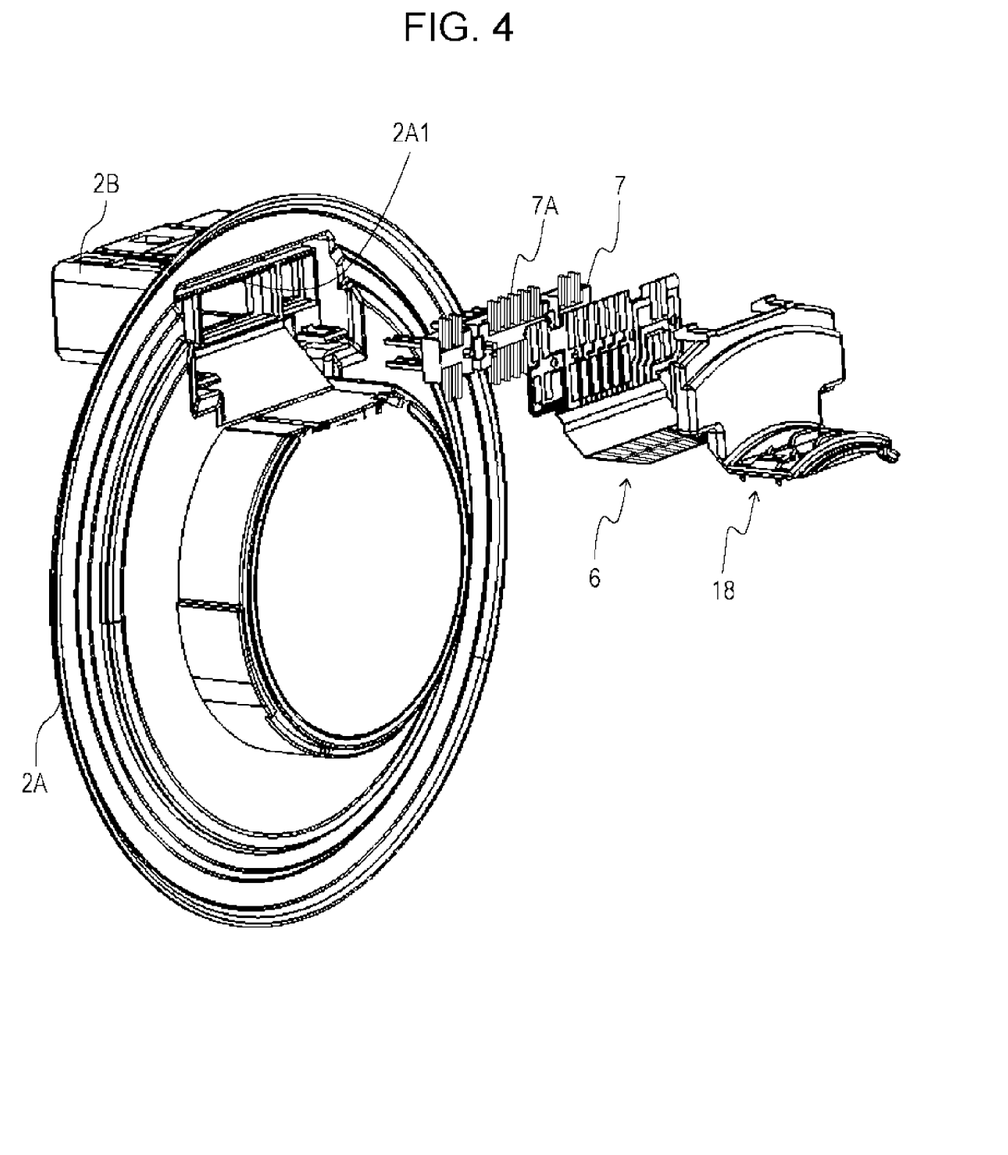
FIG. 4 is an exploded perspective view of a rotor, the external connection terminals, a first sub FPC, and a first holding member shown in FIG. 2, as seen from the inner side.
Figure 5:
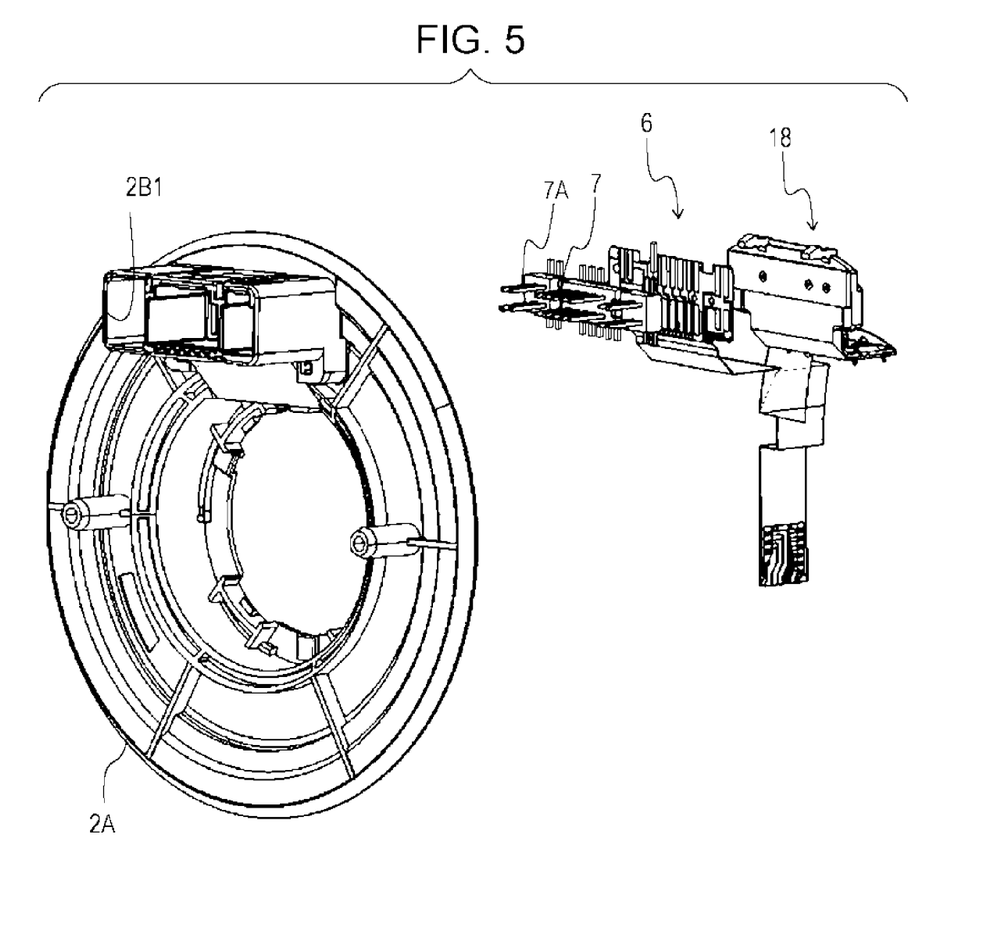
FIG. 5 is an exploded perspective view of the rotor, the external connection terminals, the first sub FPC, and the first holding member shown in FIG. 2, as seen from the outer side.
Figure 6:
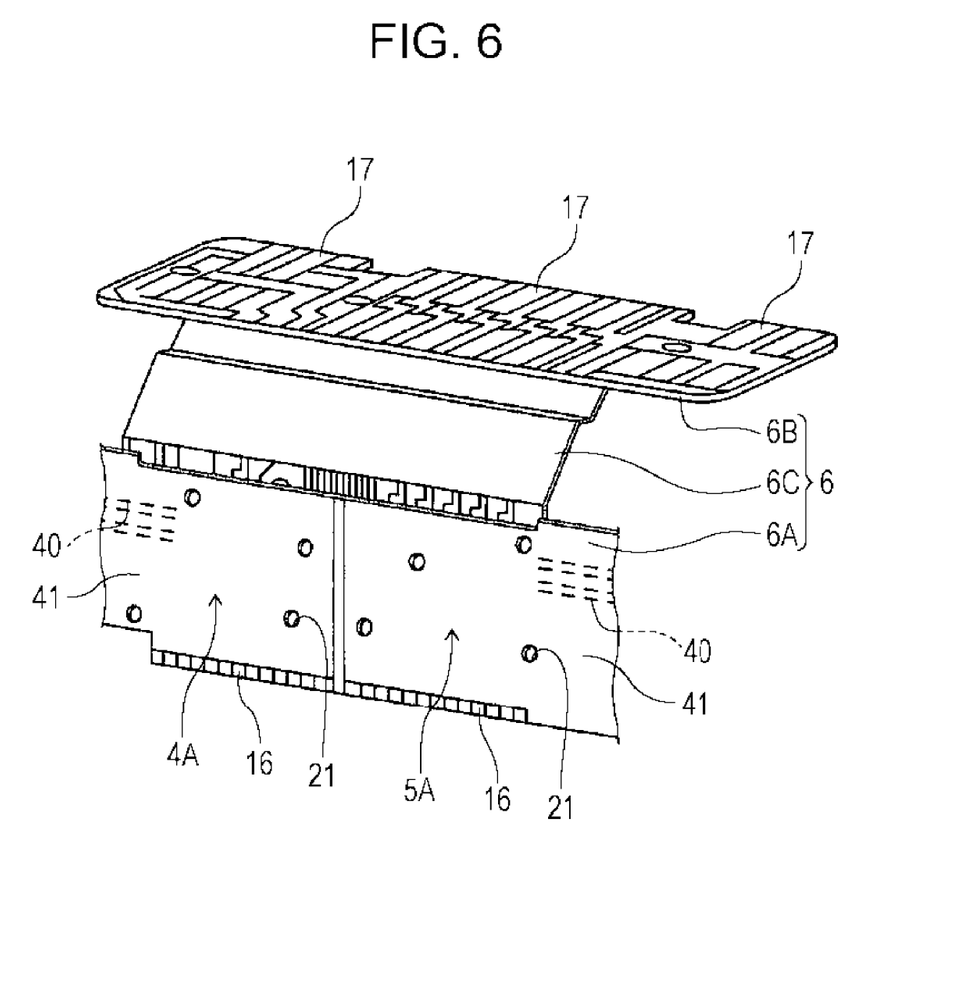
FIG. 6 is an enlarged perspective view of the first sub FPC and end portions of the first main FPC and the second main FPC shown in FIG. 2.

FIG. 4 is an exploded perspective view of a rotor 2, the external connection terminals 7A, a first sub FPC 6, and a first holding member 18 as seen from the inner side. FIG. 5 is an exploded perspective view of the rotor 2, the external connection terminals 7A, the first sub FPC 6, and the first holding member 18 as seen from the outer side. FIG. 6 is an enlarged perspective view of the first sub FPC 6 and end portions 4A and 5A of the first main FPC 4 and the second main FPC 5.

(Entire Configuration of Rotary Connector)

The rotary connector 1 is a connection device for transmitting electric signals between a steering column (not shown) and a steering shaft (not shown) of a vehicle.

As shown in FIG. 1 and FIG. 2, the rotary connector 1 includes: the annular rotor 2 that is formed from a synthetic resin and has a center portion through which the steering shaft provided within the steering column is inserted; and an annular stator 3 that is formed from a synthetic resin and attached to the steering column and to which the rotor 2 is rotatably assembled.

Within a main body of the rotary connector 1, an annular space (not shown) is formed between an inner cylinder portion 2A of the rotor 2 and an outer cylinder portion 3A of the stator 3 by combining the rotor 2 and the stator 3. Within the annular space, a first main flexible printed circuit board (hereinafter, referred to as first main FPC) 4 and a second main flexible printed circuit board (hereinafter, referred to as second main FPC) 5 for ensuring electric conduction between the rotor 2 and the stator 3 are preferably housed so as to be overlaid and wound in a spiral shape.

As shown in FIG. 3 to FIG. 6, the end portion 4A of the first main FPC 4 and the end portion 5A of the second main FPC 5 are attached to a first sub flexible printed circuit board (hereinafter, referred to as first sub FPC) 6. The first sub FPC 6 is attached to rotor-side lead blocks 7 including a plurality of external connection terminals 7A.

As shown in FIG. 4, the rotor-side lead blocks 7 are preferably incorporated in rotor-side connector portions 2B, which are provided on an upper flange portion 2A of the rotor 2 so as to project therefrom, by inserting the peripheries thereof into lead block insertion holes 2A1 formed in the upper flange portion 2A such that the peripheries are press-fitted into the lead block insertion holes 2A1. That is, the rotor-side connector portions 2B preferably fit the rotor-side lead blocks 7 to the inner walls of the lead block insertion holes 2A1, without rattling, to fix the rotor-side lead blocks 7 such that the external connection terminals 7A are housed therein.

Openings 2B1 are preferably formed in the rotor-side connector portions 2B at positions facing the external connection terminals 7A. The external connection terminals 7A are connected to terminals of an external device for the rotary connector 1 via the openings 2B1.

As shown in FIG. 2 to FIG. 5, the rotor-side lead blocks 7 integrally hold the plurality of external connection terminals 7A electrically and directly connected to connection lands 17 of the first sub FPC 6. The first sub FPC 6 is housed and fixed in the rotor-side connector portions 2B of the rotor 2.

The external connection terminals 7A and the connection lands 17 of the first sub FPC 6 are connected to each other via solder. The solder is heated by a process such as reflow and then cooled to mechanically and electrically connect the external connection terminals 7A and the connection lands 17 of the first sub FPC 6 to each other.

As shown in FIG. 2 to FIG. 5, the first holding member 18 preferably holds a region including the connection lands 17 of the first sub FPC 6 between the rotor-side lead blocks 7 and the first holding member 18. Accordingly, the connection lands 17 of the first sub FPC 6 and the external connection terminals 7A are stably fixed.

(First Main FPC and Second Main FPC)

Figure 7:
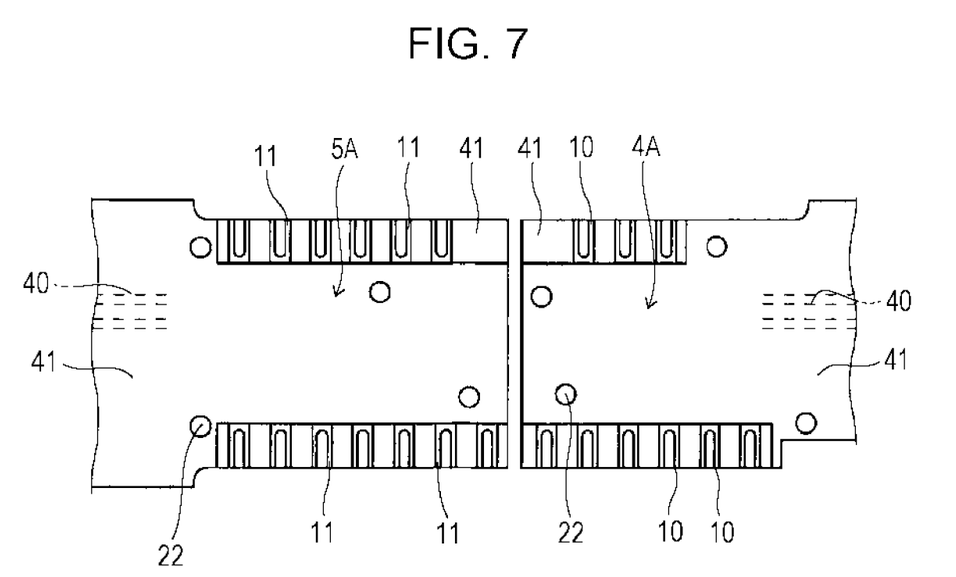
FIG. 7 is a diagram showing the end portions of the first main FPC and the second main FPC shown in FIG. 2.
Figure 8:
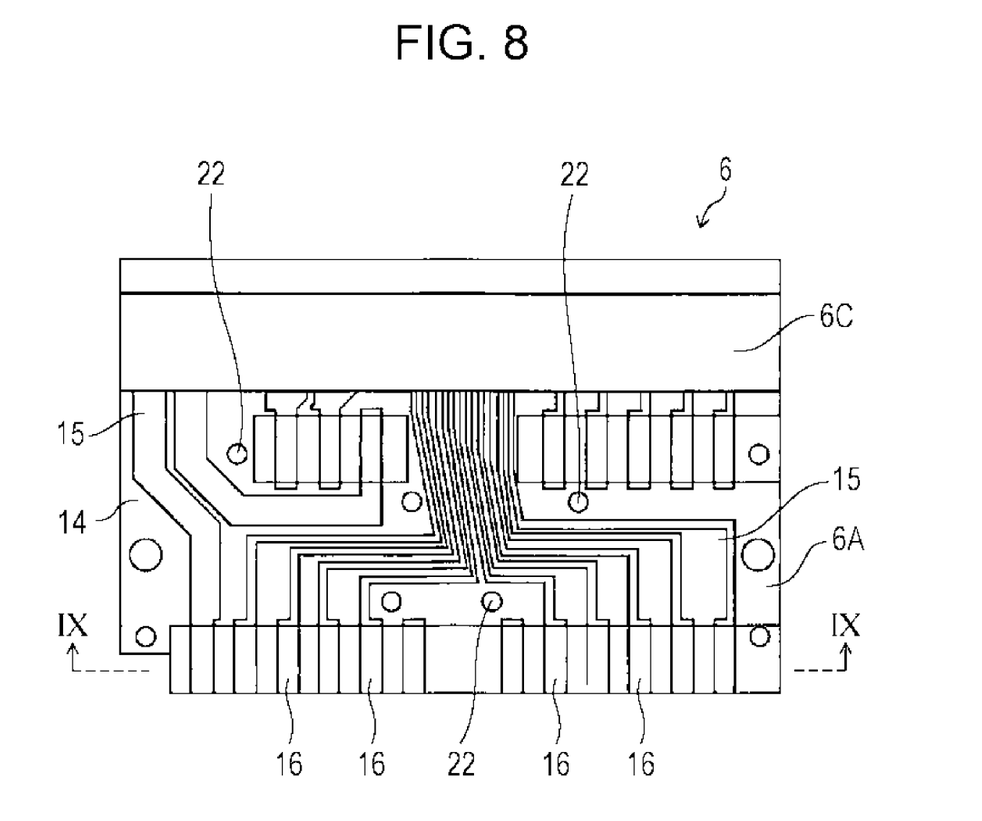
FIG. 8 is an enlarged front view of the first sub FPC shown in FIG. 2.
Figure 9:
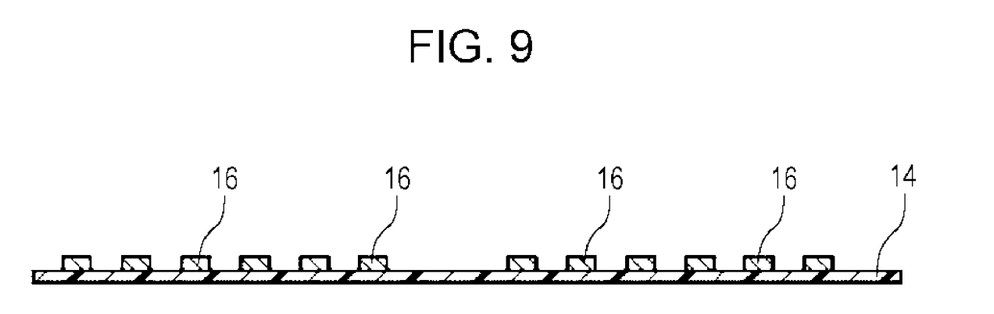
FIG. 9 is a cross-sectional view taken along the line IX-IX in FIG. 8.

FIG. 7 is a diagram showing the end portions 4A and 5A of the first main FPC 4 and the second main FPC 5. FIG. 8 is an enlarged front view of the first sub FPC 6. FIG. 9 is a cross-sectional view taken along the line IX-IX in FIG. 8.

As shown in FIG. 7, the first main FPC 4 has heat resistance and is formed by interposing a band-shaped conductor 40, which is composed of a plurality of copper foils or the like aligned in the width direction, between a pair of insulating films 41 formed from polyimide or the like and having transparency. The band-shaped conductor 40 is formed by etching in a process of producing the first main FPC 4 by photolithography, and the band-shaped conductor 40 is formed at fine pitches.

The first main FPC 4 is formed with a long length of about 50 cm, and both side edges thereof are formed straight so as to be parallel to and face each other. The first main FPC 4 is slidably housed within the annular space in a state of being wound in a spiral shape. As described above, since the first main FPC 4 is wound in a spiral shape and housed within the annular space, winding or unwinding of the first main FPC 4 are possible and an operation of turning a steering wheel (not shown) is permitted.

As shown in FIG. 7, a plurality of connection terminals 10 that are connected to the band-shaped conductor 40 and formed from a metal are aligned in the end portion 4A of the first main FPC 4. At the end portion 4A of the first main FPC 4, the insulating film 41 at the back side of the pair of insulating films 41 is partially peeled off, so that the connection terminals 10 are exposed.

As shown in FIG. 7, similar to the first main FPC 4, the second main FPC 5 also has heat resistance and is formed by interposing a band-shaped conductor 40, which is composed of a plurality of copper foils or the like aligned in the width direction, between a pair of insulating films 41 formed from polyimide or the like and having transparency. The band-shaped conductor 40 is formed by etching in a process of producing the second main FPC 5 by photolithography, and the band-shaped conductor 40 is formed at fine pitches.

Similar to the first main FPC 4, the second main FPC 5 is also formed with a long length of about 50 cm, and both side edges thereof are formed straight so as to be parallel to and face each other. By winding the second main FPC 5 in a spiral shape and housing the second main FPC 5 within the annular space, winding or unwinding of the second main FPC 5 are possible and an operation of turning the steering wheel (not shown) is permitted.

As shown in FIG. 7, a plurality of connection terminals 11 that are connected to the band-shaped conductor 40 and formed from a metal are aligned in the end portion 5A of the second main FPC 5. At the end portion 5A of the second main FPC 5, the insulating film 41 at the back side of the pair of insulating films 41 is partially peeled off, so that the connection terminals 11 are exposed.

(First Sub FPC)

As shown in FIG. 6, the first sub FPC 6 is preferably disposed so as to project in a direction orthogonal to the circumferential direction of the respective main FPCs 4 and 5. The end portions 4A and 5A of the respective main FPCs 4 and 5 are butted against each other on a first wiring portion 6A of the first sub FPC 6 and attached to the first wiring portion 6A such that the longitudinal directions of the respective main FPCs 4 and 5 are straight.

As shown in FIG. 8 and FIG. 9, the first sub FPC 6 has heat resistance and is formed by aligning a plurality of conductors 15, which are formed from copper foils or the like, on a sheet-shaped insulating film 14 formed from polyimide or the like and having transparency.

The first sub FPC 6 includes: the first wiring portion 6A to which the end portions 4A and 5A of the respective main FPCs 4 and 5 are attached; a second wiring portion 6B to which the rotor-side lead blocks 7 are attached; and a third wiring portion 6C connecting between the first wiring portion 6A and the second wiring portion 6B.

A plurality of connection terminals 16 that are connected to the connection terminals 10 and 11 provided in the end portions 4A and 5A of the respective main FPCs 4 and 5 are aligned on the first wiring portion 6A. A plurality of the connection lands 17 that are connected to the external connection terminals 7A of the rotor-side lead blocks 7 are preferably aligned on the second wiring portion 6B. A plurality of conductors (not shown) that connect between the connection terminals 16 and 17 of the respective wiring portions 6A and 6B are disposed on the third wiring portion 6C. The conductors of the third wiring portion 6C are interposed between and covered with a pair of the insulating films 14.

(First Holding Member)

As shown in FIG. 2 to FIG. 5, the rotary connector 1 preferably includes the first holding member 18 for positioning and holding the end portions 4A and 5A of the respective main FPCs 4 and 5 and the first sub FPC 6. The first holding member 18 is attached to the outer circumference of an inner cylinder portion 2C of the rotor 2. The first holding member 18 is formed as an L-shaped block body from a synthetic resin.

Figure 10:
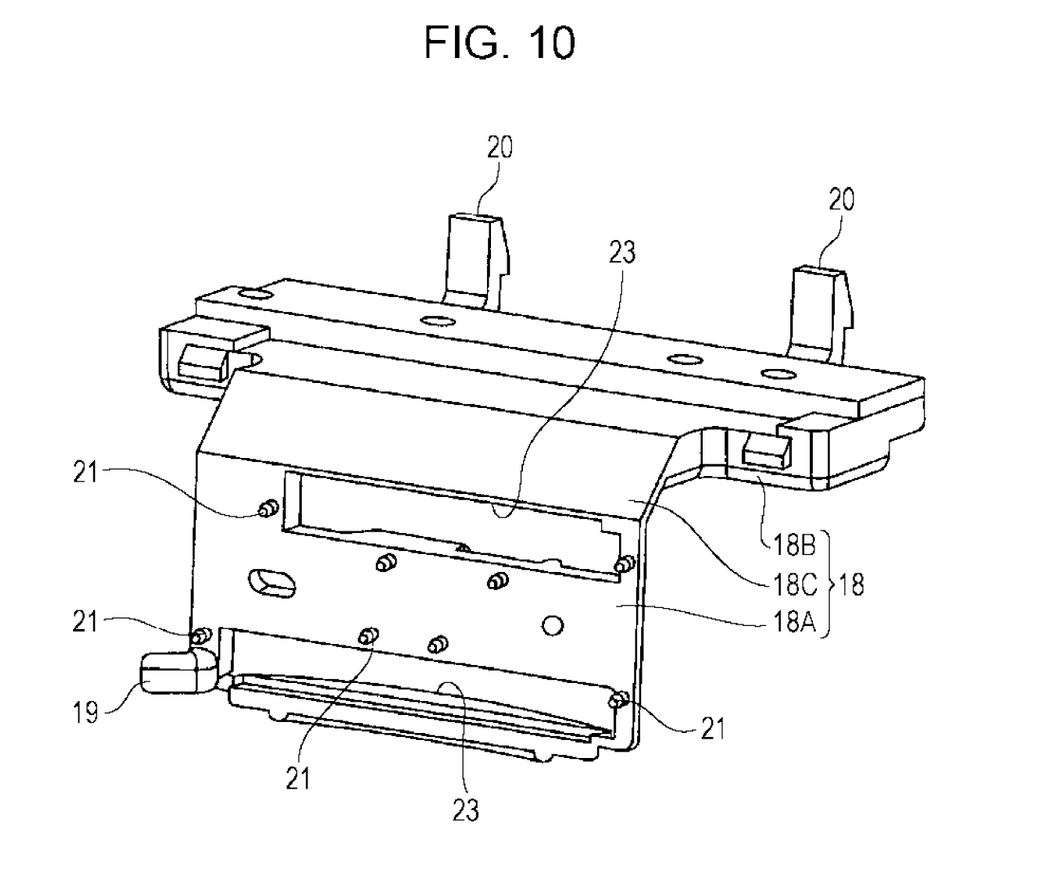
FIG. 10 is an external perspective view of the first holding member shown in FIG. 2.

FIG. 10 is an external perspective view of the first holding member 18 shown in FIG. 4.

As shown in FIG. 10, the first holding member 18 includes, in the annular space formed between the rotor 2 and the stator 3, a first holding portion 18A for positioning and holding the first wiring portion 6A of the first sub FPC 6 and the end portions 4A and 5A of the respective main FPCs 4 and 5.

The connection terminals 16 of the first wiring portion 6A and the connection terminals 10 and 11 of the end portions 4A and 5A of the respective main FPCs 4 and 5 are accurately connected to each other at predetermined positions as shown in FIG. 6, by overlaying the end portions 4A and 5A of the respective main FPCs 4 and 5 on the first wiring portion 6A held on the first holding portion 18A.

By the end portions 4A and 5A of the respective main FPCs 4 and 5 being held by the first holding portion 18A, the respective main FPCs 4 and 5 are housed within the annular space in a state where the main FPCs 4 and 5 stand in the width direction. Therefore, the respective main FPCs 4 and 5 are smoothly slidable within the annular space.

The first holding member 18 preferably includes a second holding portion 18B for holding the second wiring portion 6B of the first sub FPC 6. The rotor-side lead blocks 7 are placed on the second holding portion 18B, and the connection lands 17 of the second wiring portion 6B are interposed and held between the rotor-side lead blocks 7 and the second holding portion 18B. Accordingly, the connection lands 17 of the first sub FPC 6 shown in FIG. 6 and the external connection terminals 7A are stably connected to each other.

The first holding member 18 includes a third holding portion 18C for holding the third wiring portion 6C of the first sub FPC 6.

As shown in FIG. 10, a hook portion 19 that is engaged with an attachment portion (not shown) formed on the inner cylinder portion 2C of the rotor 2 is formed on the hook portion 19. In addition, hook portions 20 that are engaged with an attachment portion (not shown) formed on the upper flange portion 2A of the rotor 2 are formed on the second holding portion 18B of the first holding member 18.

A plurality of positioning caulking pins 21 for positioning the first wiring portion 6A and the end portions 4A and 5A of the respective main FPCs 4 and 5 overlaid and attached to the first wiring portion 6A are provided on the first holding portion 18A of the first holding member 18 so as to project from a surface to which the first wiring portion 6A of the first sub FPC 6 is attached. As shown in FIG. 7 and FIG. 8, a plurality of pin insertion holes 22 into which the positioning caulking pins 21 are inserted are formed in the first wiring portion 6A of the first sub FPC 6 and the end portions 4A and 5A of the respective main FPCs 4 and 5.

Next, a method for attaching the end portions 4A and 5A of the respective main FPCs 4 and 5, the first sub FPC 6, and the first holding member 18 will be described.

First, the rotor-side lead blocks 7 are connected to the connection lands 17 of the second wiring portion 6B of the first sub FPC 6 shown in FIG. 6 by means of solder by a process such as reflow. Next, the first sub FPC 6 is placed on the first holding member 18 such that the connection terminals 16 formed on the first wiring portion 6A of the first sub FPC 6 face toward the front side.

Next, the first wiring portion 6A is pressed against the first holding portion 18A while the positioning caulking pins 21, which are formed on the first holding portion 18A, are being inserted into the pin insertion holes 22, which are formed in the first wiring portion 6A of the first sub FPC 6 shown in FIG. 8. Accordingly, the first wiring portion 6A is positioned at a predetermined position on the first holding portion 18A.

Next, the end portions 4A and 5A of the respective main FPCs 4 and 5 are placed on the first wiring portion 6A shown in FIG. 6 such that the surfaces of the end portions 4A and 5A of the respective main FPCs 4 and 5 shown in FIG. 7 on which the connection terminals 10 and 11 are exposed face toward the back side.

Next, the end portions 4A and 5A of the respective main FPCs 4 and 5 are pressed against the first wiring portion 6A while the positioning caulking pins 21 are being inserted into the pin insertion holes 22, which are formed in the end portions 4A and 5A of the respective main FPCs 4 and 5. At this time, the respective connection terminals 10 and 11 and the respective connection terminals 16 of the wiring portion 6A are overlaid on each other via solder.

Next, the distal ends of the positioning caulking pins 21 of the first holding member 18 shown in FIG. 10, which project from the surfaces of the end portions 4A and 5A of the respective main FPCs 4 and 5, are caulked.

Accordingly, the end portions 4A and 5A of the respective main FPCs 4 and 5 and the first wiring portion 6A are overlaid and are integrally positioned and held on the first holding portion 18A shown in FIG. 10. In this state, the solder is heated by a heater tool or the like and then cooled, so that each connection terminal is mechanically and electrically connected.

Next, preferably, the surfaces of the end portions 4A and 5A of the respective main FPCs 4 and 5 are pressed against the outer circumference of the inner cylinder portion 2C of the rotor 2 together with the rotor-side lead blocks 7 on the second holding portion 18B of the first holding member 18, and the respective hook portions 19 and 20 are engaged (coupled) with the attachment portions, which are provided to the rotor 2, by snap-in mechanisms. At this time, the rotor-side lead blocks 7 are inserted into the lead block insertion holes 2A1 of the rotor 2 and held in a state where the peripheries thereof are fitted. By attaching the first holding member 18 to the outer circumference of the inner cylinder portion 2C of the rotor 2 as described above, it is possible to attach the end portions 4A and 5A of the respective main FPCs 4 and 5 and the first sub FPC 6 at predetermined positions in the rotor 2.

Figure 11:
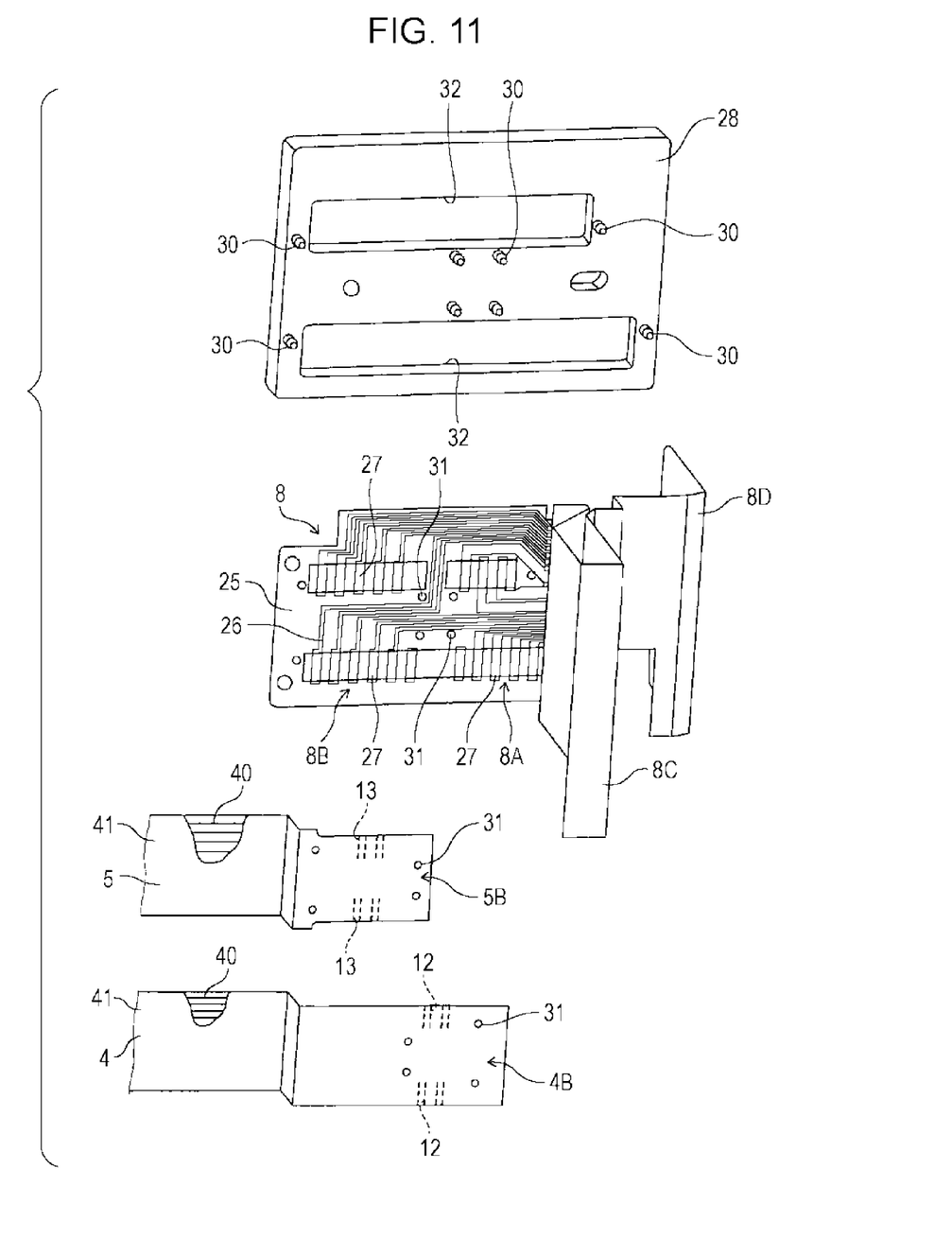
FIG. 11 is a partially enlarged diagram of an area around a second sub FPC.

FIG. 11 is a partially enlarged diagram of an area around a second sub FPC 8.

As shown in FIG. 11, another end portion 4B of the first main FPC 4 and another end portion 5B of the second main FPC 5 are attached to a second sub flexible printed circuit board (hereinafter, referred to as second sub FPC) 8. The second sub FPC 8 is attached to stator-side lead blocks 9 including a plurality of external connection terminals 9A shown in FIG. 2 and FIG. 3.

The stator-side lead blocks 9 are incorporated in stator-side connector portions 3B, which are provided on the outer circumference of the outer cylinder portion 3A of the stator 3 so as to project therefrom, via lead block insertion holes (not shown) formed in the outer cylinder portion 3A of the stator 3.

(Second Sub FPC)

As shown in FIG. 11, a plurality of connection terminals 12 that are connected to the band-shaped conductor 40 and formed from a metal are aligned in the other end portion 4B of the first main FPC 4, and are overlaid and attached to a first wiring portion 8A of the second sub FPC 8. In addition, a plurality of connection terminals 13 that are connected to the band-shaped conductor 40 and formed from a metal are aligned in the other end portion 5B of the second main FPC 5, and are overlaid and attached to a second wiring portion 8B of the second sub FPC 8. The first wiring portion 8A and the second wiring portion 8B are connected to each other.

The second sub FPC 8 has heat resistance and is formed by aligning a plurality of conductors 26 formed from copper foils or the like on a sheet-shaped insulating film 25 that is formed from polyimide or the like and has transparency.

The second sub FPC 8 includes a third wiring portion 8C and a fourth wiring portion 8D on which the two stator-side lead blocks 9 are attached, respectively.

Connection lands (not shown) are formed on the third wiring portion 8C and the fourth wiring portion 8D, and the external connection terminals 9A of the stator-side lead blocks 9 are connected to the connection lands.

A plurality of connection terminals 27 are aligned on the first wiring portion 8A in the longitudinal direction of the main FPCs 4 and 5. A plurality of connection terminals 27 are also aligned on the second wiring portion 8B in the longitudinal direction of the main FPCs 4 and 5.

(Second Holding Member)

The rotary connector 1 includes the second holding member 28 for positioning and holding the other end portions 4B and 5B of the respective main FPCs 4 and 5 and the first wiring portion 8A and the second wiring portion 8B of the second sub FPC 8. The second holding member 28 is attached to the outer circumference of the outer cylinder portion 3A of the stator 3. The second holding member 28 is formed in a plate shape from a synthetic resin.

A plurality of positioning caulking pins 30 for positioning the respective wiring portions 8A and 8B of the second sub FPC 8 and the other end portions 4B and 5B of the respective main FPCs 4 and 5 attached on the wiring portions 8A and 8B are provided on the second holding member 28 so as to project from the surface on which the first wiring portion 8A and the second wiring portion 8B of the second sub FPC 8 are attached. Pin insertion holes 31 into which the positioning caulking pins 30 are inserted are formed in the respective wiring portions 8A and 8B of the second sub FPC 8 and the other end portions 4B and 5B of the respective main FPCs 4 and 5.

As described above, in the rotary connector 1, the first sub FPC 6 including the connection lands 17 and the second sub FPC 8 are used, and are, and the rotor-side lead blocks 7 and the stator-side lead blocks 9, which integrally hold the plurality of external connection terminals 7A and 9A and are fixed to the rotor 2 and the stator 3, respectively, are used. Accordingly, it is possible to stably connect the first sub FPC 6 and the second sub FPC 8 to the external connection terminals 7A and 9A by connecting the external connection terminals 7A and 9A via solder by a process such as reflow. Thus, in the production process, it is possible to connect the first sub FPC 6 and the second sub FPC 8 to the external connection terminals 7A and 9A by means of general soldering, so that assembling is easy. That is, it is not necessary to perform spot welding as in the related art.

In the rotary connector 1, the rotor-side lead blocks 7 and the stator-side lead blocks 9 are fixed and housed, the openings 2B1 and 3B1 are provided at the positions facing the external connection terminals 7A and 9A of these lead blocks, and the rotary connector 1 has the rotor-side connector portions 2B and the stator-side connector portions 3B, which are provided to the rotor 2 and the stator 3, respectively. Thus, it is possible to stably fix the rotor-side lead blocks 7 and the stator-side lead blocks 9 to the rotor 2 and the stator 3, respectively, in a manner where the rotor-side lead blocks 7 and the stator-side lead blocks 9 are connectable through the openings 2B1 and 3B1 from the outside of the rotary connector 1.

The rotary connector 1 has the first holding member 18, which holds the region including the connection lands 17 of the first sub FPC 6 between the rotor-side lead block 7 and the first holding member 18. Accordingly, even when the external connection terminals 7A and the first holding member 18 are connected to each other by solder, it is possible to stabilize the connection state between the connection lands 17 and the external connection terminals 7A.

In the rotary connector 1, preferably, the surfaces of the end portions 4A and 5A of the respective main FPCs 4 and 5 are pressed against the outer circumference of the inner cylinder portion 2C of the rotor 2 together with the rotor-side lead blocks 7 connected by solder to the connection lands 17 of the first sub FPC 6 on the second holding portion 18B of the first holding member 18, and the respective hook portions 19 and 20 are engaged (coupled) with the attachment portions, which are provided to the rotor 2, by snap-in mechanisms. By attaching the first holding member 18 to the outer circumference of the inner cylinder portion 2C of the rotor 2 as described above, it is possible to attach the end portions 4A and 5A of the respective main FPCs 4 and 5 and the first sub FPC 6 at predetermined positions in the rotor 2 by simple work.

As shown in FIG. 10, in the first holding member 18, the first holding portion 18A, which positions and fixes the first main FPC 4 and the second main FPC 5 within the annular space between the rotor 2 and the stator 3, and the second holding portion 18B, which holds the region including the connection lands 17 of the first sub FPC 6 shown in FIG. 6 between the rotor-side lead block 7 and the second holding portion 18B, are integrally formed. Thus, the number of components is not increased, and it is possible to improve the assemblability.

In the rotary connector 1, the first main FPC 4 and the second main FPC 5, which are housed within the annular space, and the first sub FPC 6, which extends in the direction orthogonal to the longitudinal direction of the main FPC, are provided. Accordingly, it is possible to increase the flexibility in design.

In the rotary connector 1, it is possible to attach the end portions 4A and 5A of the two main FPCs 4 and 5 to the single first sub FPC 6 and attach the other end portions 4B and 5B of the two main FPCs 4 and 5 to the single second sub FPC 8. Thus, it is possible to decrease the number of components, and it is possible to reduce the component cost.

In the connection work by the process of heating the main FPCs 4 and 5 and the respective sub FPCs 6 and 8 by a heater tool or the like, in the case of setting the main FPCs 4 and 5 and the respective sub FPCs 6 and 8 to a jig, it is possible to set the main FPCs 4 and 5 and the respective sub FPCs 6 and 8 to the jig at one time, and thus the assemblability is also good.

In the present embodiment, the example in which the two main FPCs 4 and 5 are used has been described. However, the present invention is applied to use of a single main FPC and is also applied to use of multiple main FPCs such as three or more main FPCs.

The present invention is not limited to the above-described embodiment. That is, a person skilled in the art may make various modifications, combinations, sub-combinations, and alterations for the components of the above-described embodiment within the technical scope of the present invention or the equivalents thereof.

The present invention is applicable to a rotary connector for transmitting electric signals between an annular stator and a rotor rotatably assembled to the annular stator.

What is claimed is:

1. A rotary connector comprising:
   a stator;
   a rotor rotatable relative to the stator;
   a flexible printed circuit board housed within an annular space between the stator and the rotor and connected at both ends thereof to the stator and the rotor, respectively; and
   a lead block integrally holding a plurality of external connection terminals connected to the flexible printed circuit board, the lead block fixed to at least one of the rotor and the stator; wherein:
      the flexible printed circuit board has a connection land to which the external connection terminals are connected via solder,
      the flexible printed circuit board has a main flexible printed circuit board housed within the annular space, and a sub flexible printed circuit board connected to the main flexible printed circuit board and the external connection terminals and extending at an angle relative to a longitudinal direction of the main flexible printed circuit board, and
      the connection land is provided to the sub flexible printed circuit board.

2. The rotary connector according to claim 1, further comprising a connector portion fixing and housing the lead block, having an opening at a position facing the external connection terminals of the lead block, and provided to at least one of the rotor and the stator.

3. The rotary connector according to claim 1, further comprising a holding member holding a region including the connection land of the flexible printed circuit board between the lead block and the holding member.

4. A rotary connector comprising:
   a stator;
   a rotor rotatable relative to the stator;
   a flexible printed circuit board housed within an annular space between the stator and the rotor and connected at both ends thereof to the stator and the rotor, respectively;
   a lead block integrally holding a plurality of external connection terminals connected to the flexible printed circuit board, the lead block fixed to at least one of the rotor and the stator; and
   a holding member holding a region including the connection land of the flexible printed circuit board between the lead block and the holding member; wherein:
      the flexible printed circuit board has a connection land to which the external connection terminals are connected via solder, and
      in the holding member, a first holding portion positioning and fixing a portion, located within the annular space, of the flexible printed circuit board within the annular space, and a second holding member holding the region including the connection land of the flexible printed circuit board between the lead block and the second holding member are disposed.

5. The rotary connector according to claim 3, wherein, in the holding member,
   a first holding portion positioning and fixing a portion, located within the annular space, of the flexible printed circuit board within the annular space, and a second holding member holding the region including the connection land of the flexible printed circuit board between the lead block and the second holding member are disposed.

6. The rotary connector according to claim 1, wherein the stator has an outer cylinder,
   the rotor has an inner cylinder facing the outer cylinder and is disposed so as to be coaxial with the stator, and
   the flexible printed circuit board is housed within the annular space between the outer cylinder and the inner cylinder.

7. A rotary connector comprising:
   a stator;
   a rotor rotatable relative to the stator;
   a flexible printed circuit board housed between the stator and the rotor and connected at both ends thereof to the stator and the rotor, respectively; and
   a lead block holding a plurality of external connection terminals connected to the flexible printed circuit board, the lead block fixed to at least one of the rotor and the stator; wherein:
      the flexible printed circuit board has a connection land to which the external connection terminals are connected,
      the flexible printed circuit board has a main flexible printed circuit board housed within the annular space, and a sub flexible printed circuit board connected to the main flexible printed circuit board and the external connection terminals and extending at an angle relative to a longitudinal direction of the main flexible printed circuit board, and
      the connection land is provided to the sub flexible printed circuit board.

8. The rotary connector according to claim 4, wherein at least one of the rotor and the stator and the holding member are connected to each other by a snap-in mechanism.

9. A rotary connector comprising:
   a stator;
   a rotor rotatable relative to the stator;
   a flexible printed circuit board housed between the stator and the rotor and connected at both ends thereof to the stator and the rotor, respectively;
   a lead block holding a plurality of external connection terminals connected to the flexible printed circuit board, the lead block fixed to at least one of the rotor and the stator; and
   a holding member holding a region including the connection land of the flexible printed circuit board between the lead block and the holding member; wherein:
      the flexible printed circuit board has a connection land to which the external connection terminals are connected via solder, and in the holding member, a first holding portion positioning and fixing a portion, located within the annular space, of the flexible printed circuit board within the annular space, and a second holding member holding the region including the connection of the flexible printed circuit board between the lead block and the second holding member are disposed.

* * * * *